(No Model.)
A. R. TURNER, Jr.
TWINE PACKAGE.
No. 318,933. Patented May 26, 1885.
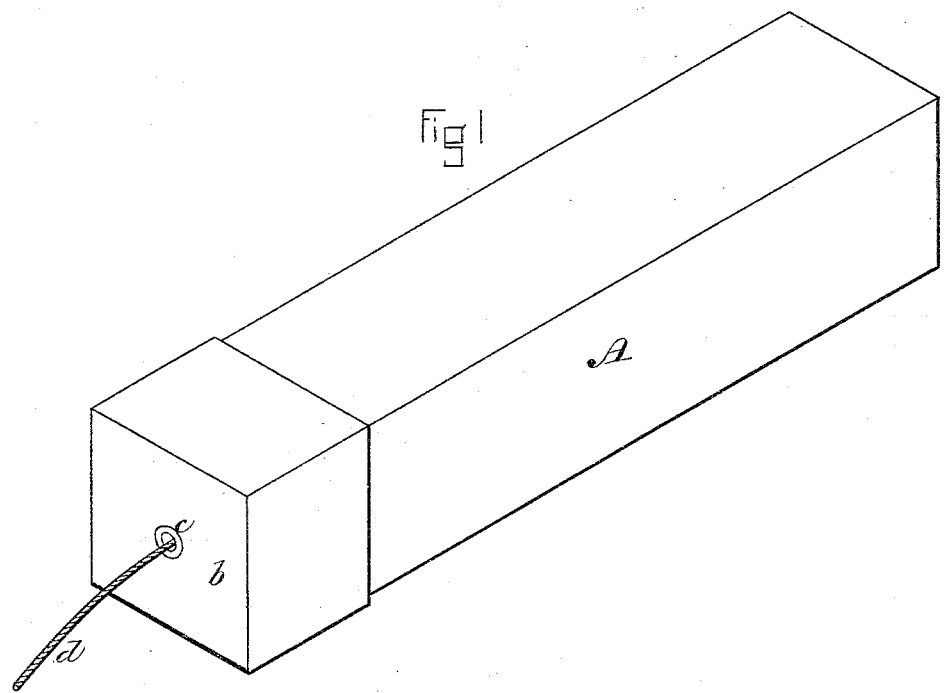
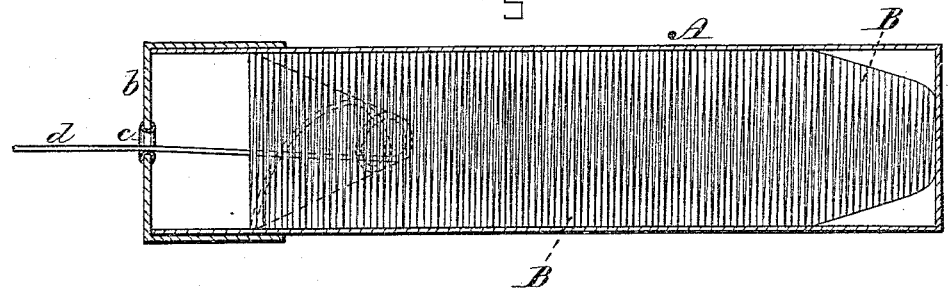
WITNESSES
W. J. Cambridge
C. V. Young
INVENTOR
Alfred R. Turner Jr.
per F. O. Taschemacker
Atty

UNITED STATES PATENT OFFICE.

ALFRED R. TURNER, JR., OF MALDEN, MASSACHUSETTS.

TWINE-PACKAGE.

SPECIFICATION forming part of Letters Patent No. 318,933, dated May 26, 1885.

Application filed February 24, 1885. (No model.)

*To all whom it may concern:*

Be it known that I, ALFRED R. TURNER, Jr., a citizen of the United States, residing at Malden, in the county of Middlesex and State of Massachusetts, have invented an Improved Twine-Package, of which the following is a full, clear, and exact description, reference being had to the accompanying drawings, making part of this specification, in which—

Figure 1 is a perspective view of my improved twine-package. Fig. 2 is a sectional elevation of the same.

Where an ordinary ball of twine is placed within a box or holder having a central aperture through which the twine is delivered for use, as the twine is drawn from the interior of the ball, the latter, when nearly used up, becomes a mere shell and then collapses, which generally causes a tangling of the twine remaining within the box, resulting in loss and inconvenience.

My invention has for its object to remedy this difficulty and to provide a neat and compact twine-package for general use in offices and elsewhere; and it consists in a roll of twine wound in a peculiar manner and placed in an elongated box having at one end a delivery aperture or guide for the passage of the twine, the said roll of twine being formed by building it up from one end to the other as it is wound, so that as the twine is delivered from one end it will gradually reduce the length of the roll until the latter is entirely used up, in contradistinction to constantly reducing the thickness of the mass of twine from the interior outward, as occurs in unwinding an ordinary ball as heretofore, whereby the free and easy delivery of the twine is effected and all liability of its becoming tangled within the box avoided.

In the said drawings, A represents an elongated box, preferably composed of paper or other suitable cheap material, and provided at one extremity with a cap or cover, b, having a central aperture or guide, c, through which the twine d is drawn as required for use.

Within the box A is placed the twine, put up in the form of an elongated roll, B, of such length and diameter as to fill, or nearly fill, the interior of the box. This roll B is formed by building it up gradually from one end to the other as it is wound, in such manner that in unwinding, as the twine is drawn out or delivered through the aperture c at the end of the box A, the roll will become gradually reduced in length until entirely used up, instead of being reduced in thickness to a shell, as is the case with an ordinary ball of twine, and consequently it cannot collapse, and there is no liability of its becoming at any time tangled within the box, much inconvenience and delay being thereby avoided.

In forming the roll B the twine may be wound so that it will deliver from the interior or exterior of the same, as may be preferred, the roll here shown being wound to cause the twine to deliver from the interior of one end, as seen in Fig. 2. I do not, therefore, limit myself to any particular form of winding the twine, provided it is so wound that in unwinding it will cause the roll to become gradually reduced in length from one end to the other until it is entirely used up.

A twine-package put up as described can be furnished at very little expense, and will be found extremely useful and salable, as it is very compact, and can be easily stowed away in a shallow drawer or narrow compartment of a desk, or carried in the pocket ready for immediate use.

I am aware that an elongated roll of twine formed by building it up from one end to the other is not broadly new, and such I do not claim as my invention.

What I claim as my invention, and desire to secure by Letters Patent, is—

The combination, with the box A, having at one end a cap or cover, b, provided with a delivery aperture or guide, c, of the roll of twine B, contained within the box A, and formed by building it up from one end to the other as it is wound, in such manner that in unwinding it will be gradually reduced in length until entirely used up, substantially as described.

Witness my hand this 19th day of February, A. D. 1885.

ALFRED R. TURNER, JR.

In presence of—
P. E. TESCHEMACHER,
W. J. CAMBRIDGE.